3,443,970
FATS PROTECTED AGAINST RANCIDITY
Paul A. Wolf and Allen K. Prince, Midland, Mich., assignors to The Dow Chemical Company, Midland, Mich., a corporation of Delaware
No Drawing. Continuation-in-part of application Ser. No. 102,932, Apr. 14, 1961. This application Jan. 6, 1965, Ser. No. 423,852
Int. Cl. A23d 5/04; B01j 1/16; C11b 5/00
U.S. Cl. 99—163      8 Claims

ABSTRACT OF THE DISCLOSURE

Fats are protected from rancidity by incorporating therein a small amount of an acylacetone, the acyl group of which contains from 10 to 26 carbon atoms, optionally with the inclusion of a very small amount of a free radical acceptor. The acylacetone vary strongly suppresses the formation of free radicals, which initiate rancidity. Consequently, the capacity of a very small amount of a free radical acceptor in inhibiting development of rancidity is greatly enhanced.

---

This application is a continuation-in-part of U.S. Patent application, Ser. No. 102,932, filed Apr. 14, 1961, now abandoned.

The present invention relates to the preservation of fats, and in particular is concerned with the inhibition of rancidity in fats, the improved products thus obtained, and the process whereby they are obtained.

There is general agreement among chemists that the development of rancidity in fat involves chemical reactions which take place, in general, in a sequence of steps of which the first step is the conversion of portions of a representative fat molecule which may be long chain aliphatic acyl groups characteristic of an undecomposed fat, into free radicals. In a succeeding step or steps, such free radical is converted into or converts other portions of fat into the substances characteristic of rancidity. In view of this theory, there have been employed, as rancidity-inhibiting substances numerous chemical compounds compatible with fats which are known to be free radical acceptors which, by accepting them, inactivate such radicals. By inactivating free radicals which may be formed, such substances, in even very small amounts, appreciably inhibit, but do not altogether eliminate the tendency of fats to become rancid.

When, eventually, sufficient free radicals have been formed that the capacity of such preservative substances to inactivate free radicals is exhausted, then the subsequent formation of free radicals in the fat gives rise to rancidity.

Now we have discovered that the relatively uniform distribution, in a fresh fat exposed to conditions conducive to the development of rancidity, of a small amount of an acyclic higher aliphatic hydrocarbylcarbonylacetone very strongly suppresses the formation of free radicals, with the result that the initiation of rancidity is inhibited, and the further result that the capacity of a very small amount of free radical acceptor to inhibit development of rancidity is greatly enhanced.

The acyclic higher aliphatic hydrocarbylcarbonylacetone compounds to be employed according to our invention are such substances as oleoylacetone, stearoylacetone, and other acylic higher aliphatic hydrocarbylcarbonylacetone compounds of which the acylic higher aliphatic hydrocarbylcarbonyl groups is of from about 10 to about 26 carbon atoms. Whether such group is saturated or unsaturated is without effect upon the present invention. For convenience, the acylic higher aliphatic hydrocarbylcarbonyl group of from about 10 to about 26 carbon atoms, and only said group is, in the present specification and claims, occasionally designated as "acyl" or "acyl group."

While we do not wish to be bound by any theory which may, with further study, prove to be in error, whereas our invention is operative, nevertheless we believe that the acyclic higher aliphatic hydrocarbon portion of the molecule to be employed in our invention is of value chiefly because it renders remaining portions of the molecule readily soluble in fats. We believe further, that the dicarbonyl structure.

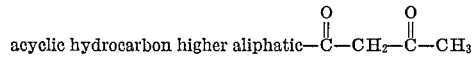

in some way acts, in a fresh fat susceptible of degradation to form free radicals, to inhibit the formation of such free radicals before they form. Correspondingly, our invention is practiced by carrying out the process which comprises the step of adding to a fat, substantially before the induction of the formation of free radicals therein, a rancidity-inhibiting amount of an acylacetone compound of which the acyl moiety contains from about 10 to about 26, inclusive, carbon atoms. Lower acylacetones appear to be of diminishing effectiveness or ineffective and, because they are more volatile they are more fugitive. They are therefore not preferred.

In light of the foregoing, then, we can state that a principal product of our invention is a fat which, in its unmodified form is susceptible of becoming rancid, modified by the addition thereto of a minimal rancidity inhibiting amount of an acylic higher aliphatic hydrocarbylcarbonyl acetone. In view of the improvement we can produce in fats protected by free radical acceptors, our invention includes such modified fats further modified by the addition thereto of a rancidity inhibiting amount of a free radical acceptor which is compatible with fat. These products are prepared, in general, by the method which comprises the step of adding a small amount of an acyclic higher aliphatic hydrocarbylcarbonyl acetone to and mixing it intimately with a fresh fat which in its natural state is susceptible of becoming rancid.

One embodiment, a preferred embodiment of the present products, is a fat which in its unmodified state is susceptible of becoming rancid modified by the addition thereto of a minimal rancidity inhibiting amount of oleoylacetone. However, an even more preferred embodiment of our invention is a fat which in its unmodified state is susceptible of becoming rancid modified by the addition thereto of a minimal rancidity inhibiting amount of oleoylacetone and also a minimal rancidity inhibiting amount of a free-radical acceptor.

As a convenient composition of matter wherewith to practice our invention, we have invented a concentrate composition adapted to be added in relatively small amounts to fats which in unmodified form are susceptible of rancidity comprising, in combination, a carrier that is compatible with fats and may itself be a fat, oleoylacetone in an amount equal to from about 1 to about 60 percent by weight of fat, butylated hydroxyanisole in the amount of from about 1 to about 60 percent by weight of fat, butylated hydroxyanisole in the amount of from about 1 to about 60 percent by weight of fat, the total weight of oleoylacetone and butylated hydroxyanisole being not more than about 60 percent by weight of resulting composition. Other alkanoylacetones and free-radical acceptors can, of course, be employed, within the scope of the present specification.

In the storage of fat-bearing food stuffs and in the manufacture of refined fats from animal or vegetable sources, our rancidity-inhibiting agents can be applied to fat-bearing tissue before such tissue is placed into storage or rendered to refined fat. The application is readily made by, for example, brushing, spraying or dipping with a solvent solution of the alkanoylacetone. Thus we have invented the method which includes the step of applying to the external surfaces of fat-bearing tissue derived from a living organism a rancidity-inhibiting amount of an acyclic higher aliphatic hydrocarbylcarbonylacetone. Such applications appear to establish a barrier at the surfaces exposed to air and therefore most susceptible of oxidation. We have also thus invented the rancidity-inhibiting composition which consists essentially of rancidity inhibiting agents that are an acyclic higher aliphatic hydrocarbylcarbonylacetone and a free-radical acceptor, together with a solvent for the said rancidity-inhibiting agents.

Now that the present invention has been made, carrying it out in practice involves no serious technological problems that we are aware of. In treating a bulk, rendered fat, relatively free from free radicals of the sorts which initiate rancidity, the fat is heated at a temperature whereat it is either melted or at least soft enough that a compatible liquid can be mixed with it. Thereto, while the fat is in a soft or melted condition, the desired acylacetone compound or a mixture of such compounds is added. These compounds are characteristically liquids at room temperature or at temperatures not much above room temperature; they are miscible with fats over a wide range of proportions, and their addition in a liquid or solid form is readily carried out.

If desired, more quickly to effect uniform dispersion of the acylacetone compound in the fat, the said acetone compound in a desired amount or proportion can first be dispersed in a fat and diluent, which may advantageously be a portion of the fat to be treated. This fat then containing the acylacetone in a concentration substantially higher than the desired concentration in the finished protected fat is added in a desired amount to the whole amount of fat to be protected and intimately mixed therewith so as to achieve relatively uniform dispersion of the acylacetone compound throughout the fat. The fat so treated may also at the same or at a different time, if desired, be protected by the inclusion therein of a free-radical acceptor. Among the free-radical accepting substances to be employed in the present invention are butylated hydroxytoluene, butylated hydroxyanisole, and tocopherols. The combination of our invention and a free-radical acceptor provides unusually good protection to fats from becoming rancid under conditions favorable to the development of rancidity.

When the addition of the desired rancidity-inhibiting substances has been carried out, the fat may then further be processed in any way commonly in use in industry. It may, for example, be packaged, bulk shipped, stored under normal environmental temperatures and the like.

The amount of acylacetone compound to be employed in carrying out our invention is an amount effective to inhibit rancidity: this is an amount that inhibits the initiation of free radical formation in the fat to be protected under the conditions to which it is exposed. Because fats are of such various natures, and the environmental conditions to which they may be exposed are susceptible of extreme variation, it is possible to set forth amounts which are rancidity inhibiting amounts of acylacetones in only very general terms. However, those skilled in the art, thus informed, can readily conduct simple range finding experiments under conditions peculiar to their own requirements and thereby ascertain what amount is the smallest effective amount. In general, for economy and to avoid difficulty and complication in subsequent employment of the fat, an amount not much greater than the smallest effective amount is a preferred amount.

When a fat is to be stored under refrigerated conditions in the dark in glass or other inert container, and especially when such storage is of no very great duration, very small amounts of acylacetone as defined are effective. Thus, for example, an amount as small as 100 parts of acyclic higher aliphatic hydrocarbylcarbonylacetone per million parts by weight of fat affords appreciable protection. However, when storage conditions to which a fat is to be exposed are less favorable, as, for example, when the fat is to be exposed to light and air and at normal human environmental temperatures or higher temperatures, larger amounts may be needed.

The employment of an amount of acyclic higher aliphatic hydrocarbylcarbonylacetone equal to approximately $\frac{1}{100}$ of 1 percent by weight of fat provides very substantial and prolonged protection against the initiation of the formation of free radicals. For such uses as do not contraindicate the inclusion of very substantial amounts, up to 1 percent by weight of fat of said acylacetone may with advantage be included in the fat to be protected. However, when fats are exposed to conditions that would render such large amount desirable, degradation of forms other than the typical development of rancidity are likely to take place with the result that the employment of amounts greater than 1 percent is seldom or never advantageous. On the other hand, the inclusion of our rancidity-inhibiting acylacetone compounds in amounts substantially smaller than 100 parts by weight per million parts of fat frequently confers satisfactory protection upon the fat. Correspondingly, no rigid lower limit concentration can be stated.

The following examples illustrate the practice of our invention sufficiently to enable those skilled in the art to practice the invention successfully, without more, and set forth the best practices of the invention that we know. Lard is used in the examples because it is very susceptible to rancidity. Other fats as herein defined are similarly protected.

EXAMPLE 1

About 100 pounds of freshly rendered lard, yet melted from the rendering operation, is divided into two portions; one portion being about 99½ pounds and the other portion about ½ pound. Into the ½ pound portion there is added with stirring, .001 pound of n-decanoylacetone, and it is intimately mixed therewith by stirring. The resulting dispersion is added to the other portion of melted lard, the entire amount then being 100 pounds of lard with the indicated amount of decanoylacetone. The resulting product is thereafter routinely packaged and placed into storage.

EXAMPLE 2

A lard is prepared as in Example 1 except that there is added to the half pound of fat, together with the decanoylacetone, a rancidity-inhibiting amount of a free-radical acceptor selected from the list published in the Federal Register, p. 847, Jan. 27, 1961. The resulting product is likewise packaged and stored.

EXAMPLE 3

The efficacy of the present invention was demonstrated by testing a lard composition freshly prepared as in Example 2 for oxidation in the manner of Gearhart, Stuckey and Austin, as described in the Journal of the American Oil Chemists Society, vol. 34, p. 427 (1957). The procedure employed and the results obtained were as follows. A substrate was prepared by combining $\frac{1}{100}$ of 1 percent by weight of butylated hydroxytoluene with freshly prepared lard. The resulting product corresponded closely to a commercially available lard product protected only by an antioxidant material of the free-radical acceptor type. This product was further modified by the addition thereto of a small amount of a copper salt, 0.00156 weight percent of $CuSO_4 \cdot 5H_2O$ by weight of lard. Copper and its compounds are known to enhance the formation of free radicals in fats exposed to rancidity-developing conditions. Therefore, the inclusion of the said copper substance provided a positive background situation to challenge the β-diketone substance of the present invention.

Of the substrate fat material thus prepared, samples were tested in unmodified form, and other samples were modified by the addition thereto of various substances. The samples, in glass cups, were enclosed and tested one at a time within stainless steel bombs provided with constant temperature heating means, means for the introduction of oxygen under pressure, and means for continuous recording of gas pressure internal to the bomb. In carrying out the test, the sample was placed within the bomb, gaseous contents thereof were flushed out with oxygen and, with an atmosphere of essentially pure oxygen, the bomb was closed and internal oxygen pressure raised to a pressure of 100 pounds per square inch by gauge with the bomb maintained at a temperature of 60° C. In this situation, the bomb and contents were maintained over an extended period of time. An end point of rancidity inhibition was assumed to be reached when any sample began to take up appreciable amounts of oxygen occasioning thereby a distinctive decrease in pressure internal to the bomb as indicated on a pressure recorder. The effectiveness of any system of rancidity inhibiting substances was then ascertained in terms of the duration of exposure of bomb contents to oxygen under the said conditions before such end point was noted.

In one test, the said substrate consisting essentially of lard, butylated hydroxytoluene, and copper, as hereinbefore stated, reached an end point after 108 hours exposure whereas the same composition with 0.02 percent by weight of stearoylacetone reached an end point after 125 hours; an increase of 15 percent.

When the experiment was replicated employing new samples, the substrate alone reached an end point after 180 hours whereas the substrate modified by the addition thereto of 0.02 percent of stearoylacetone reached an end point only after 208 hours. This represents a gain of approximately 20 percent in stability.

A further replicate experiment essentially the same as the foregoing except that the employed alkanoylacetone was oleoylacetone determined an end point for the substrate at 185 hours after 240 hours when the experiment was discontinued, the fat substrate containing the oleoylacetone in the amount of 0.02 percent by weight of substrate had not yet reached an end point. Similar results are obtained when employing, for example, decanoylacetone or hexacosanoylacetone.

Among the higher acylacetones to be employed according to the present invention are lauroylacetone, myristoylacetone, palmitoylacetone, stearoylacetone, arachidoylacetone, behenoylacetone, and lignoceroylacetone. Also cerotoylacetone, undecyloylacetone, tridecyloylacetone, pentadecanoylacetone, margaroylacetone, nondecanoylacetone, $\Delta^9$-decenoylacetone, stilingoylacetone, $\Delta^9$-dodecenoylacetone, oleoylacetone, ricinoleoylacetone, petroselinoylacetone, vaccenoylacetone, linoleoylacetone, linolenoylacetone, eleostearoylacetone, licanoylacetone, parinaroylacetone, gadoleoylacetone, arachidonoylacetone, cetoleoylacetone, erucoylacetone, selacholeoylacetone, and like higher alkanoylacetones.

The alkanoylacetones to be employed in the present invention are prepared in known manners, as for example, the method of Adams and Hauser in the Journal of the American Chemical Society, vol. 67, p. 284 and following, using boron trifluoride as catalyst.

As employed throughout the present specification and claims, the expression fat refers to a fat or oil of animal or vegetable origin, in the sense of a glyceryl ester of a fatty acid. The expression is inclusive also of synthetic or modified fats including the mono and difatty acid esters of glycerol, as well as the natural trifatty acid esters thereof. Our invention is particularly useful in the protection of fat substances of which the fatty acid moieties are unsaturated, or polyunsaturated, inasmuch as fats containing such moieties are apparently particularly susceptible to rancidity.

Our invention is particularly concerned with inhibition of rancidity in butter, in oleomargarine containing mono and diglycerides, in lard, in tallow, in oils of safflower, sunflower, cotton, corn and peanut seed: in oil of fish liver such as cod, halibut, and shark: in the inhibition of rancidity in animal fats in muscle tissue, and in oils such as linseed and tung used in paints and resins.

We claim:
1. A fat which, in its unmodified form is susceptible of becoming rancid, containing a rancidity-inhibiting amount of a higher-acylacetone, the acyl group of which contains from 10 to 26 carbon atoms.

2. Composition of claim 1 comprising also a rancidity-inhibiting amount of a free-radical acceptor which is compatible with fat.

3. The method of protecting a fat, which in its natural state is suscepitble of becoming rancid, which comprises the step of adding thereto a rancidity-inhibiting amount of a higher acylacetone, the acyl group of which contains from 10 to 26 carbon atoms.

4. A fat which in its unmodified state is susceptible of becoming rancid containing a rancidity-inhibiting amount of oleoylacetone.

5. Composition of claim 4 also containing a minor amount of a free-radical acceptor which is compatible with fat.

6. A concentrate composition adapted to be added in relatively small amounts to fats which in unmodified form are susceptible of rancidity comprising, in combination, a carrier that is compatible with fats, oleoylacetone in an amount equal to from about 1 to about 60 percent by weight of fat, butylated hydroxyanisole in the amount of from about 1 to about 60 percent by weight of fat, the total weight of oleoylacetone and butylated hydroxyanisole being not more than about 60 percent by weight of resulting composition.

7. In the manufacture of a refined fat from an animal source wherein the fat is rendered, the improvement which comprises applying to the exposed surfaces of fatty animal tissue a rancidity-inhibiting amount of a higher acylacetone wherein the acyl group contains from 10 to 26 carbon atoms.

8. In the manufacture of a refined fat from an animal source wherein the fat is rendered, the improvement which comprises applying to the exposed surfaces of fatty animal tissue a rancidity-inhibiting amount of a composition comprising a higher acylacetone wherein the acyl group contains between 10 and 26 carbon atoms, a fat-compatible free-radical acceptor and a solvent for the rancidity-inhibiting acylacetone.

References Cited

UNITED STATES PATENTS 2,328,711  9/1943  Crandall et al. _____ 44—77 X
2,690,396  9/1954  Chenicek _____ 99—163 X MAURICE W. GREENSTEIN, *Primary Examiner.*

U. S. Cl. X.R.

99—150, 157; 252—407; 260—398.5